Oct. 25, 1932.  B. WALKER  1,884,932
VEHICLE LIFTING AND TRAVERSING DEVICE
Filed April 30, 1931   5 Sheets-Sheet 1

INVENTOR.
Brooks Walker.
BY
Harness, Dickey, Pierce & Hann.
ATTORNEYS.

Oct. 25, 1932.   B. WALKER   1,884,932
VEHICLE LIFTING AND TRAVERSING DEVICE
Filed April 30, 1931   5 Sheets-Sheet 4

INVENTOR.
Brooks Walker.
BY
ATTORNEYS.

Oct. 25, 1932.  B. WALKER  1,884,932
VEHICLE LIFTING AND TRAVERSING DEVICE
Filed April 30, 1931   5 Sheets-Sheet 5

INVENTOR.
Brooks Walker.

BY
ATTORNEYS.

Patented Oct. 25, 1932

1,884,932

UNITED STATES PATENT OFFICE

BROOKS WALKER, OF PIEDMONT, OAKLAND, CALIFORNIA

VEHICLE LIFTING AND TRAVERSING DEVICE

Application filed April 30, 1931. Serial No. 533,944.

My invention relates to vehicle lifting and traversing devices and particularly to a device which constitutes a part of an automotive vehicle which may be actuated to raise one end of the vehicle and to drive it in an arc about the wheels of the opposite end thereof.

Among the objects of my invention are; to provide a device of the above mentioned type which is actuatable to extended and retracted position by a mechanism which is controlled through the operation of the vehicle engine; to provide a connection between the engine and the wheels of the device by means of which the transmission may be utilized for swinging the raised end of the car sidewise in either direction; to provide interconnecting means between the mechanism for actuating the device to extended and retracted position and the driving means for the wheels thereof, which automatically effects the connection of the driving wheels before the wheels of the vehicle are raised from the ground; to provide a plurality of detents with the device at least one of which shall be available for locking the frame of the car to the axle, another of which shall be available in the retracted position of the device for effecting its support and for permitting the device to be released when a positive force is applied thereto through the actuating mechanism; and to provide a locking means between the lifting device and the axle which permit the frame to be carried by the axle springs independent of the device.

Further objects of my invention are; to provide means for controlling the actuation of the vehicle raising device and for connecting the device with the driving means of the vehicle in a predetermined sequence through a single operation of a lever; to provide means for preventing the actuation of a device when the engine or drive shaft of the vehicle is being operated above a predetermined speed and to provide indicating means which is effective during the actuation of the device for indicating the raising or the lowering of the vehicle.

Other objects and features of novelty of my invention will be either specifically pointed out or will become apparent, when referring for a better understanding of my invention, to the following description in conjunction with the accompanying drawings, wherein:

Fig. 9, is a broken view, in elevation, of a modified form of raising device which my invention may assume, Fig. 17 is an enlarged view of a portion of the structure illustrated in Fig. 5, illustrating the retaining latch thereof.

While various attempts have been made in the past to provide lifting and transporting structures for vehicles in order to assist in the parking, turning or otherwise manipulating the vehicle by other means than the four wheels provided thereon, difficulty has been experienced in providing a structure which is readily attachable to a vehicle, which is fool-proof and which is easily controlled by an operator.

In practicing my invention I provide a lifting and transporting device which is readily attachable to the chassis of a vehicle and to the driving means thereof and which is controlled by a single lever to raise or lower the device and to connect and disconnect the device from the driving means.

After the device is raised the vehicle is shifted sidewardly by the actuation of the clutch and transmission, which controls the operation of the driving shaft in the usual manner. Various modified forms of the structure, employed for raising and lowering the wheels of the device and for locking the device to the axle, are illustrated and will now be described in detail.

Figure 1:
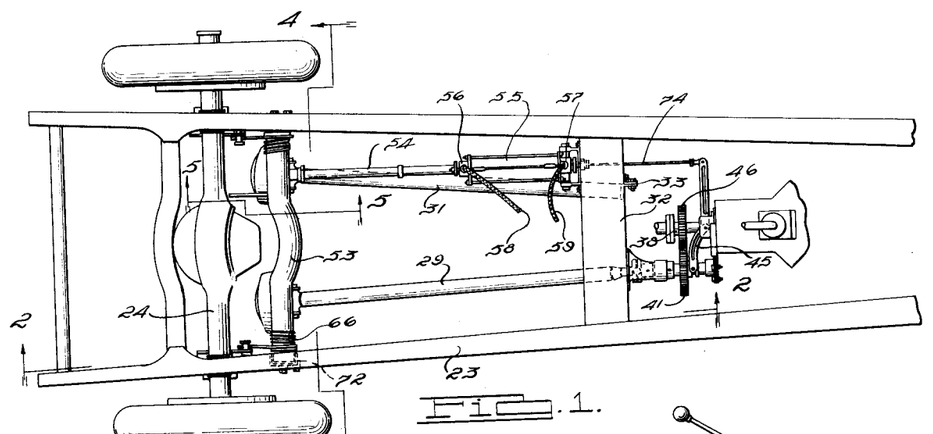
Figure 1 is a plan view of the rear portion of the vehicle chassis employing the raising and transporting device which embodies features of my invention.
Figure 2:
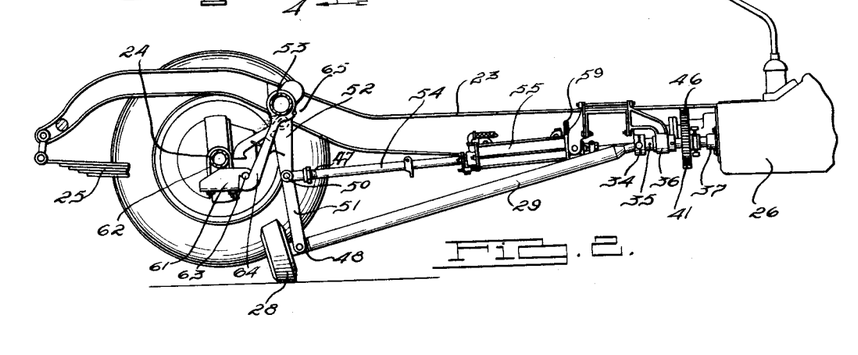
Fig. 2 is a sectional view of the structure shown in Fig. 1 taken on the line 2—2 thereof, illustrating the driving shaft of the lifting device.
Figures 3, 18, 19, 20, 21:
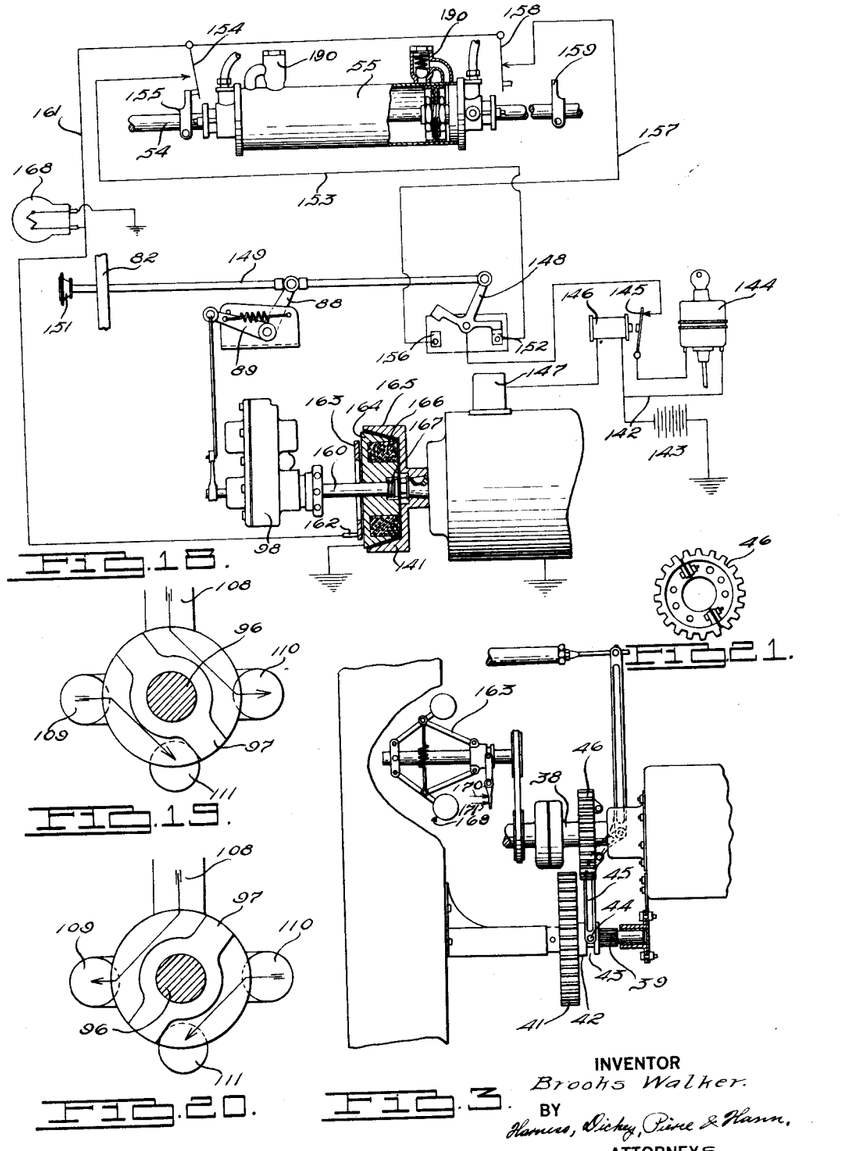
Fig. 3 is an enlarged plan view of a portion of the device illustrated in Fig. 1.
Fig. 18 is a wiring diagram of a system which may be employed with the control means illustrated in Fig. 6 or with the modified form of control structure illustrated in the figure.
Fig. 19 is a diagrammatical view of a valve of the pump employed with my device, illustrating the flow of fluid when the valve is in one position.
Fig. 20 is a view, similar to that illustrated in Fig. 19, with the valve disposed in an opposite position.
Fig. 21 is a plan view of a gear which is mountable on the drive shaft of the vehicle, as illustrated in Fig. 3.
Figure 4:
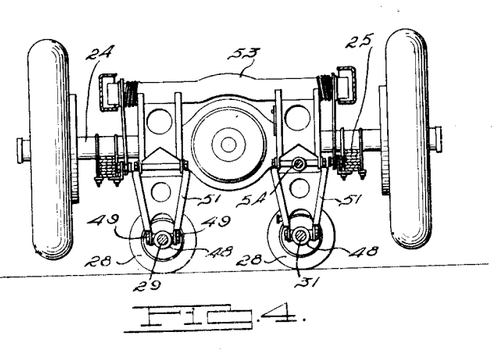
Fig. 4 is a sectional view of the structure illustrated in Fig. 1 taken on the line 4—4 thereof.

Referring particularly to Figs. 1 to 5, I have illustrated an automobile chassis as comprising a frame 23 a rear axle housing 24, rear springs 25, a transmission 26 which is connected to the clutch and engine of the vehicle in the conventional manner. The lifting and traversing device 27 which is supported on the chassis, includes a pair of wheels 28 which are supported on the end of the driving shafts 29 and the idling shaft 31, the shaft 31 being pivotally supported on the bracket 33 mounted on cross member 32 of the frame. The shaft 29 is connected through a universal joint 34 to a shaft 35 which is supported by bearings 36 and 37 in parallel relation to the driven shaft 38 extending from the transmission 26. The shaft 36, as illustrated in Fig. 3, is splined medially of the bearings 36 and 37 for engaging the inner spline of the gear 41 for retaining the gear in slidable and rotational relation with the shaft. A collar 42 extends from the front side of the gear 41 and is provided with a groove 43, in which pins 44 of a bifurcated lever 45 engage for the purpose of shifting the gear 41 longitudinally on the shaft 35.

A gear 46, which is shown in Fig. 21 as being of the split type for facilitating its assembly on the drive shaft 38 of the vehicle, is employed to drive the gear 41 after it has been moved longitudinally on the shaft 35 into engagement therewith. In this manner the shaft 29 is driven through the drive shaft 38 of the vehicle for driving the wheel 28 which is mounted in fixed relation to the end of the shaft 29.

Collars 48 are rotatably mounted on the shafts 29 and 31 and are provided with trunnions 49 for receiving links 51 which extend upwardly therefrom and are connected by pins 50 to arms 52 which are fixed to a shaft 53 supported on the frame 23 in a manner which will be explained more fully hereinafter. The pins 50 on one link also support one end of a piston rod 54 which is slidable within the cylinder 55 through the actuation of a piston (not shown) which is supported on the rod 54. Adjustable means 47 is provided on one end of the piston rod 54 for the purpose of regulating its length relative to the cylinder 55 and the lifting device.

The cylinder 55 is provided with supports 56 and 57 disposed on its opposite ends which are connected by suitable tubing 58 and 59 to a valve of a pump in a manner which will be explained hereinafter. The double acting hydraulic cylinder 55 actuates the lifting device in both directions through one of the toggles comprising the link 51 and arm 52, the other toggle being operated by the torque transmitted therefrom through the common cross shaft 53 which effects the simultaneous operation of both toggles to lift the vehicle squarely. The passing of the toggles over their center positions retains the vehicle in its raised position independently of the fluid pressure after the piston has reached the end of its stroke. A by-pass valve 70 is provided adjacent to each end of the cylinder 55 to permit the continuous circulation of the fluid around the piston after it has reached the end of its stroke and during the time the pump is being actuated.

A pair of brackets 61 are supported in fixed relation on the rear axle housing 44 by U bolts 62, the brackets are provided with pins 63 which extend from the sides thereof. A pair of hooks 64 are mounted in pivotal relation to the shaft 53 and are engaged, at 65, by the end of a spring 66 one end of which is mounted in fixed relation to the shaft 53. The bias of the spring is such that the initial rotation of the shaft 53 causes the clockwise rotation of the hook 64 into engagement with the pins 63 for the purpose of connecting the axle housing 24 in fixed relation to the shaft 53. During the retractive movement of the device, the bias of the spring is released, by encountering a stop fixed to the shaft 53, causing the hook 64 to be rotated with the shaft 53 out of engagement with the pin 63 toward the end of the movement thereof.

Figure 5:
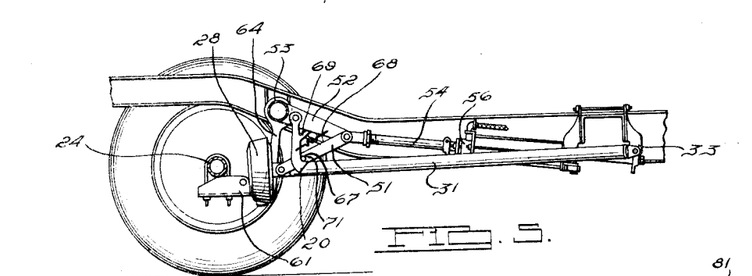
Fig. 5 is a broken sectional view of the structure illustrated in Fig. 1 taken on the line 5—5 thereof illustrating the idle shaft thereof and the lifting and traversing device in retracted position.

A hook 20 is mounted in pivotal relation to the arm 52, as illustrated in Fig. 5, for the purpose of engaging the pin 67, mounted on the link 51, for retaining the lifting and transporting device in retracted position. A spring 68 is provided between the lower end of the hook 60 and the arm 52 for the purpose of biasing the hook 60 into latching engagement with the pin 67. An arm 69, extends from the side of the hook 60 and engages the arm 52 when the hook is in an unlatched relation to the pin 67, for the purpose of holding the hook in proper position for latching with the pin 67 when the arm is fully raised by the piston rod 54. The engaging portion 71 of the hook slopes in such manner a to permit the lowering of the wheels in the application of sufficient lowering pressure from the cylinder which is preferably far in excess of the weight of the device. The slope however is sufficient to positively support the device in the presence of the bias effected by the spring 58.

Figure 16:
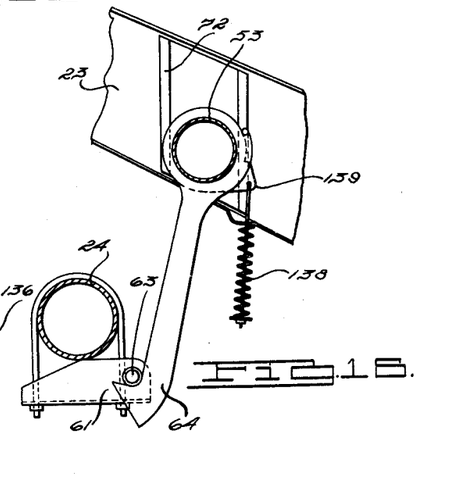
Fig. 16 is a view of an axle hooking device and structure for supporting the vehicle lifting device on the frame.

The shaft 53 is supported in the channel member 72, as shown in Figs. 1, 2 and 16 for vertical movement between the flanges of the frame 23. When the hooks 64 engage the pins 63 the axle is supported by the lifting device independent of the frame, and the springs 25 are available for supporting and cushioning the vehicle during its movement, effected by the lifting and traversing device.

Figure 14:
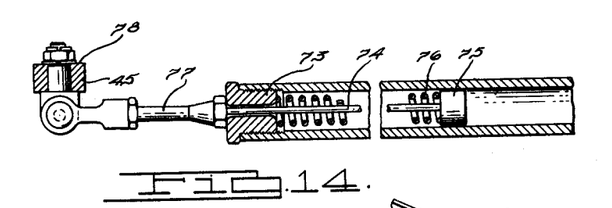
Fig. 14 is an enlarged sectional view of the piston rod and the interconnecting means associated therewith for controlling the driving means for the lifting device.

The piston rod 54 extends entirely through the cylinder 55, the rear end portion thereof being hollow and, as illustrated in Fig. 14, is provided with a threaded bushing 73 through which a rod or cable 74 extends. The inner end of the cable is attached to a member 75 which engages one end of a spring 76 provided within the piston rod 54. A link 77 extends frontwardly from the bushing 73 and is connected by means of the pivotal supporting member 78 to the end of the bifurcated lever 45 opposite to the end carrying the pins 44.

As the piston rod is moved relative to the cylinder 55, the movement of the cable 74 therewith causes the actuation of the lever 45 to shift the gear 41 longitudinally into and out of engagement with the gear 46. During the initial movement of the piston rearwardly to actuate the device to raise the vehicle, the cable 74 is drawn rearwardly through the bias of the spring 76, for increasingly tensioning the end of the lever 45 for moving the gear 41 forwardly on the shaft 35. This related movement is so arranged that the gears are in mesh with each other before the wheels of the lifting device engage the ground so that braking may be effected before the lifting actually starts in the event that the car is elevated on the side of a hill.

It is to be understood that the braking of the rear wheels locks the rear axles and driveshaft in fixed position and prevents the movement of the gears 41 and 46 which thereby brakes the wheel 28 of the lifting device. The further movement of the piston to completely raise the rear wheels from the ground causes the spring 76 to be further compressed to effect a bias which is available in case the gears 41 and 46 have moved into abutting rather than meshed relation, to cause the meshing of the gears upon the first relative movement thereof out of abutting relation.

Figure 6:
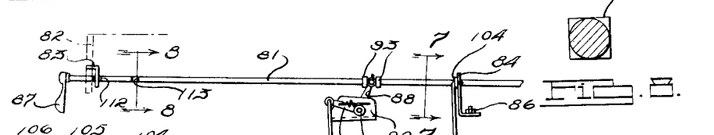
Fig. 6 is an elevational view of the control and actuating device employed with the structure illustrated in the foregoing figures.
Figure 7:
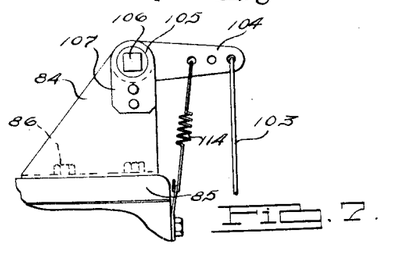
Fig. 7 is an enlarged sectional view of the structure shown in Fig. 6, taken on the line 7—7 thereof.
Figure 8:
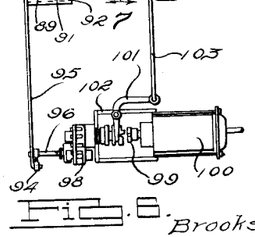
Fig. 8 is an enlarged sectional view of the structure shown in Fig. 6, taken on the line 8—8 thereof.

Referring to Figs. 6, 7 and 8 I have shown the control mechanism which may be employed with my lifting and transporting device including a square rod 81 which extends through the instrument board 82 and which is supported by brackets 83 and 84 which are supported respectively on the instrument board and the engine block 85 by bolts 86. The bracket 83 is provided with a square hole for normally retaining the rod 81 against rotation. A handle 87 is mounted on the rear end of the rod for effecting its actuation longitudinally and for rotating the rod when in either of its longitudinal positions.

A pair of arms 88 and 89 are mounted in fixed relation with a shaft 91 which is supported on a bracket 92 which may likewise be mounted on the engine block. The arm 88 extends between a pair of collars 93, provided on the rod 81, for effecting the angular movement of the arm as the rod 81 is moved longitudinally. The angular movement of the arm 88 rotates the shaft 91 which moves the arm 89 angularly to effect the angular movement of an arm 94 through the interconnection of the arms by a link 95 cause a shaft 96 to be rotated. The rotation of the shaft 96 causes a valve 97, illustrated in Figs. 19 and 20, to be revolved from one to the other of the positions illustrated in the figures for changing the direction of flow of fluid from a pump 98 in the conductors 58 and 59 leading to the cylinder 55. The actuation of the pump is effected through a clutch 99 which interconnects the pump with the generator 100 of the automotive engine or to any other driving means thereof which may be utilized for this purpose. A bell crank 101 is fastened to a frame 102, which supports the pump on the generator, and effects the actuation of the clutch 99 into engaged and disengaged position. A rod 103 interconnects the bell crank 101 with an arm 104 which is mounted in fixed relation to a bushing 105 which is provided with a square hole 106 through which the square rod 81 extends. The bushing 105 is rotatably supported on the bracket 84 against longitudinal movement by the bracket 107.

When it is desired to actuate the device to raise the rear end of the vehicle, the handle 87 is drawn rearwardly causing the angular movement of the arms 88, 89 and 94 for effecting the rotation of the valve 97 in a clockwise direction into the position illustrated in Fig. 20. The pressure side 108 of the pump is then connected to the orifice 109 to which the conductor 59 is connected for delivering the fluid to the front end of the cylinder 55. The conductor 58 is connected to the orifice 110 which, in the position of the valve illustrated in Fig. 20, is connected to the suction side 111 of the pump. When the valve has been shifted to this position the partial rotation of the handle 87 in a counter-clockwise direction, rotates the rod 81 and the arm 104, to cause the bell crank 101 to be rotated in a counter clockwise direction to effect the movement of the clutch 99 into engaged position. The ensuing actuation of the pump 98 causes a fluid, such as oil, to be forced into the cylinder 55 to cause the piston thereof, and therefore the piston rod 54, to be actuated rearwardly for effecting the raising of the vehicle.

To permit the rod 81 to be rotated at its forward and rearward positions I have machined the rod into cylindrical shape at 112 and 113 which are the points on the rod which are adjacent to the bracket 83 in the extreme positions of the rod. The alignment of the square hole in the bracket 83 and the square rod 81 occurs only when the clutch is disconnected. In Fig. 8 I have shown a section through the rod 81 at the point 113, to illustrate the cylindrical form of the rod at the two positions. This construction prevents the shifting of the valve except when the pump is disconnected. A spring 114 is provided between the arm 104 and the engine block as illustrated in Fig. 7, for the purpose of returning the handle 87 to normal position when it is released after the vehicle has been raised or lowered.

As pointed out hereinabove, during the initial rearward movement of the piston rod 54, the gear 41 is moved into mesh with the gear 46 so that after the car has been completely raised the gears of the transmission may be employed along with the clutch of the vehicle in the conventional manner for driving the shaft 29 and therefore the wheel 28 for moving the vehicle in either direction about the opposite end thereof. After the vehicle has been moved to a desired position, the handle 87 is pushed inwardly toward the dashboard 82 until the machined portion 112 of the rod 81 registers with the bracket 83 after which the partial counter-clockwise rotation of the handle 87 causes the clutch 99 to again move into mesh relation after the valve has been moved into the position illustrated in Fig. 19. In this position the fluid, supplied by the pump 98, is directed through the conductor 58 to the rear end of the cylinder 55. The piston and piston rod 54 is thereby drawn frontwardly to cause the lifting device to be moved into retracted position, which is that illustrated in Fig. 5. After having been moved into this position, the releasing of the handle permits the spring 114 to return the handle to normal position and to release the clutch 99. The supporting device is retained in retracted position by the hook 60 which engages the pin 67 as has been pointed out hereinabove.

In Fig. 9 I have illustrated the collar 48 and the link 51 illustrated in Fig. 1 as comprising a unit member 115 which is rotatably supported on a shaft 116 to which the wheel 117 is keyed. A second universal joint 118 is provided in the drive shaft 29 for providing flexibility thereto to permit the substantial vertical movement of the wheel. The link 115 is pivoted to the arm 52, which is supported in fixed relation to the shaft 53, and a second arm 119 is fixed to the shaft and pivoted to the piston rod 54. The arm 119 may be considerably shorter than the arm 52 and requires less movement of the piston rod 54 for effecting the lowering and retrieving of the wheel than was necessary when the rod was attached to the knee of the toggle as illustrated in Fig. 5. In this construction the hook 64 is pivoted directly to the frame 23 by a pin 121 and a spring 122 connects the projecting arm 123 of the hook to the arm 52 for biasing the hook into engagement with the pin 63 at the initial downward movement of the wheel. A biasing member 120 may be employed between the frame 23 and the shaft 53 to permit relative movement therebetween and the cushioning of the vehicle relative to the lifting device.

Figures 5, 10, 11:
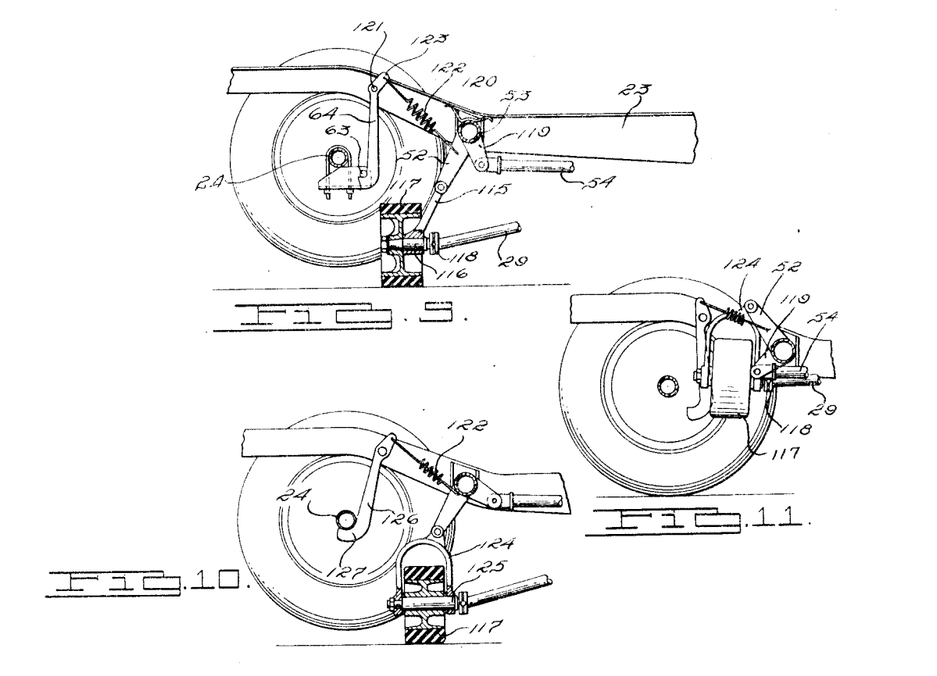
Fig. 10 is a view, similar to that of the structure illustrated in Fig. 9, showing a further modified form thereof.
Fig. 11 is a view of the structure shown in Fig. 10 with the lifting device in retracted position.

In Fig. 10 I have illustrated a similar wheel and operating structure wherein a bifurcated member 124 is substituted for the link 115, which spans the wheel 117 and is rotatably supported on a shaft 125 to which the wheel is keyed. A hook 126, which is supported on the frame and actuated by the spring 122 in the same manner as the hook 64 illustrated in Fig. 9, is provided with an end 127 which engages the axle housing 24 for supporting the axle directly to the frame thereby eliminating bracket 61. In Fig. 11 I have shown the structure in retracted position to illustrate the relative position of the bifurcated member 124, the arms 119 and 52 and the driving and operating shaft 54 and 29. It will be noted that in this construction the wheel 117 is moved substantially vertical into retracted position and that wheels may be employed having treads parallel to the axis of rotation. It is to be understood that the structure illustrated in Fig. 9 may be retrieved to a position similar to that illustrated in Fig. 11, the one view being considered sufficient for illustrating the retrieved position of both constructions. It is to be further understood that the conductors 58 and 59 may be interchanged relative to the ends of the cylinder 55, for the purpose of effecting the forward movement of the piston rod 54 for raising the vehicle when the handle 87 is moved forwardly and revolved.

Figure 12:
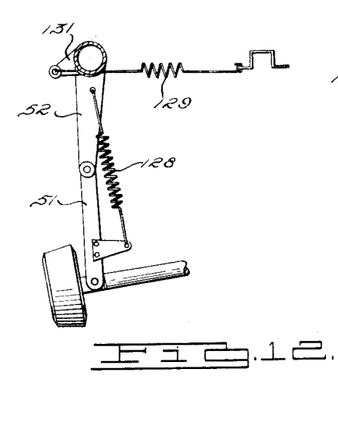
Fig. 12 is a diagrammatic view of a modified form which my lifting structure may assume.
Figure 13:
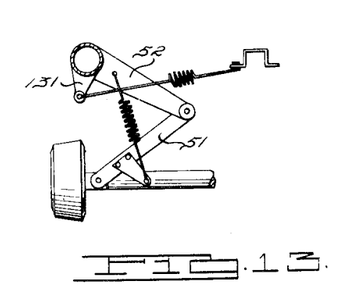
Fig. 13 is a view of the structure illustrated in Fig. 12 with the lifting device in retracted position.

In Figs. 12 and 13 I have illustrated a pair of springs 128 and 129 which may be employed in the place of or in conjunction with the hook 60 for retaining the device in retracted position. In Fig. 12 I have shown the device in extended position which is that in which the vehicle has been lifted, to illustrate the position of the springs in their maximum tensioned position. In this position the bias of the spring effects a minimum retaining force for the device and an arm 131, which supports one end of the spring 129, is substantially aligned with the shaft in a direction opposite to the pull of the spring.

The spring 129 is effective for retaining the lifting device in extended position because of the over center position of the toggle formed by the arm 52 and the link 51. In Fig. 13 it will be noted that the springs exert a force through a maximum effective arm for retaining the device in retrieved position because of the advantageous position of the link 131 and the arm 52 and links 51, in which position a bias of the springs exert a more advantageous holding force for retaining the device in retrieved position.

Figure 15:
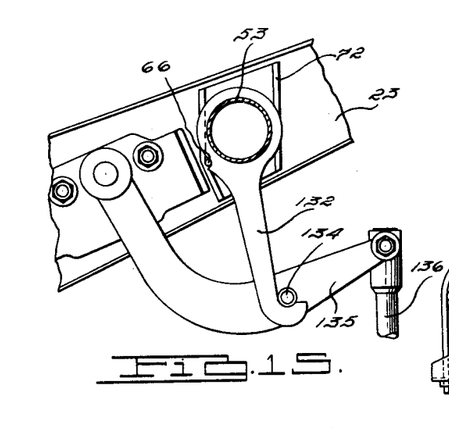
Fig. 15 is a broken view, in elevation, of a retaining member which may be employed with my lifting and traversing mechanism.

In Fig. 15, I have shown a modified form which the hook 64, which supports the rear axle housing to the lifting device may assume. A hook 132 is supported on the shaft 53 for rotational movement thereon and is controlled by the spring 66 as hereinabove described. A pin 134 is attached to an arm 135 of a shock absorber arm, the link portion 136 thereof being pivotally attached to the axle. When this construction is employed, the bracket 61 may be dispensed with, the support of the axle being effected through the interconnection of the hook 132 and the pin 134 of the shock absorber. It will be noted that the shaft 53 is movable relative to the frame 23 and that the vehicle spring is thereby available for cushioning the vehicle when in raised position, as described hereinabove.

In Fig. 16, I have shown the hook 64, in engagement with the pin 63 of the bracket 61, for rigidly supporting the axle housing 24 to the lifting device during the lifting of the vehicle. I employ a spring 138 attached to an arm 139, which is rigidly mounted on the shaft 53, in such manner as to exert a minimum force when the hook 64 is in engagement with the pin 63 and to exert a maximum force when disengagement is effected therebetween through the retrieving of the lifting and transporting device. The purpose of the spring 138 and the arm 139 is to provide a bias to each end of the shaft 53 for retaining it in the lower part of the channel 72 and for preventing the bouncing and rattling of the device when the vehicle is in operation and the device is in retrieved position.

Referring to Fig. 18, I have illustrated a wiring diagram to show the method which I prefer to employ for interconnecting the various elements of my device for effecting a positive and reliable operation thereof. I have illustrated a magnetic clutch 141 which may be substituted for the mechanical clutch 99 illustrated in Fig. 6. A circuit from a battery 143 passes preferably through the ignition switch 144 to a switch 145 which is magnetically operated by a solenoid 146. The solenoid is series related to the battery and a circuit breaker 147, which is employed for inserting the generator circuit in series with the battery when the charging voltage thereof has exceeded a predetermined value depending upon the speed of rotation of the generator armature. It will be noted that the switch 145 is normally retained in circuit closed position and is moved into circuit open position by the energization of the solenoid 146 which is effected when the circuit breaker 147 is moved to closed position when the generator is operated at sufficient speed for providing a charging current to the battery 143. In this construction the switch 45 is in closed position only when the speed of the engine of the vehicle is below that for effecting the rotation of the armature of the generator to produce a sufficient charging voltage. This means that the engine is substantially idling when the switch 145 is closed to complete the circuit to the control system for the lifting device from the battery 143.

A reversing switch 148 of the single-pole double-throw type is controlled by a longitudinally actuatable rod 149 extending through the dash 82 and terminating in a handle 151 by which the movement of the rod is effected. Arms 88 and 89, above referred to, are actuatable by the rod 149 for controlling the movement of the valve 97 employed in the pump 98 in the same manner as that above referred to in regards to the structure illustrated in Fig. 6. In the forward position of the handle 151, which is that shown in which the device is retained in retrieved position, the switch 148 is tilted to engage a contact 152 to pass current through a circuit 153 to the switch 154. An arm 155 is attached to the piston rod 54 for the purpose of engaging the end of the switch 154 and for moving it to open position at the end of the forward stroke of the piston.

When the vehicle is to be raised, with the engine at idle speed the handle 151 is pulled outwardly to shift the valve 97 into the position illustrated in Fig. 20 and to tilt the switch 148 to have the arm thereof complete a circuit through a contact 156. Current then flows through a conductor 157 to a switch 158 which is in closed position when the rod 54 is in its frontward position. An arm 159 is provided on the front end of the shaft which engages the switch 158 to move it to open position at the rearwardmost movement of the piston rod 54 when the vehicle is fully raised. Prior to the opening of the switch 158, current passes through the conductor 161 to a brush 162 which is in engagement with a collector ring 163 mounted for rotation with the clutch 141.

The magnetic clutch 141 comprises a pair of iron members 164 and 165 having, respectively, exteriorly and interiorly disposed conical surfaces which are engageable with each other when drawn into intimate engagement by the flux provided by the winding 166 which is disposed within the member 164 and energized through the brush 162 and collector ring 163 and ground. A spring 167 is disposed between the member 164 and the pump shaft 160 for biasing the member 164 out of engagement with the member 165 when the coil 166 is energized.

A suitable indicating means 168, herein shown as a lamp, is connected to the circuit 161 and to ground and is available for indicating the raising or lowering operation during the actual movement of the mechanism. After the handle has been pulled out, the energization of the clutch 141 causes a flow of fluid to the cylinder 55 which causes the piston rod 54 thereof to move rearwardly, when employed with the structure illustrated in Figs. 1 to 5 inclusive, until the arm 159 thereof engages a switch 158 and moves the switch to open position to deenergize the circuit 161, the clutch 164 and the indicating means 168. An auxiliary safety device may be employed in the form of a by-pass 190 around the piston at both ends of the stroke to eliminate excess pressure in case the pump is kept in driving engagement after the piston has reached the end of the stroke.

After the car has been shifted laterally to a predetermined position, the handle 151 is then moved inwardly, to the position shown in the drawings, at which position the switch 148 completes a circuit through the contact 152 to cause current to flow through the circuit 153, the switch 154 and the circuit 161 to energize the clutch 141 and the indicating means 168. The initial movement of the rod 149 operates the valve 97 to shift it to the position illustrated in Fig. 19 in which position the piston rod 54 is moved to the front end of the cylinder 55 when the clutch 141 is energized thereafter. During this movement the indicator 168 is available for indicating the movement of the piston rod until the arm 155 thereof engages and opens the switch 154 to deenergize the circuit 153, the clutch 141, and the indicating means 168. It is to be understood that the switch 145 is available for deenergizing the circuit during the lifting or lowering of the vehicle when the engine thereof is operated above generator charging speed, to prevent the too rapid operation of the device.

It will be noted that when the clutch 141 is employed the raising and lowering operation is effected by the outward and inward movement respectively of the handle 151. It is to be understood that instead of connecting the solenoid 146 to the switch 145, that the solenoid may be connected in such manner when energized to insert a detent (not shown) into engagement with the rods 81 or 149 or their associated parts to restrain them from actuation. In such a construction the rod 81 or 149 would be prevented from being actuated during the time that the switch 147 is closed, which occurs when the generator, and therefore the vehicle engine is operated at more than idling speed.

In Fig. 3 I have illustrated a fly ball operated switch 169 which is driven directly from the drive shaft 38 for breaking the circuit 170 and 171 from the battery and to the clutch or other device, respectively, for deenergizing the circuit when the shaft is rotating above a predetermined speed. Such a construction is desirable in a vehicle which employs free wheeling since the engine may be at idling speed at the time the vehicle is moving at a considerably greater relative speed. When the switch is operated from the drive shaft the actual movement of the car controls the operativeness or inoperativeness of the device. However the governor may be driven from any other suitable source such as the speedometer cable.

While I have described and illustrated several embodiments of my invention it will be apparent to those skilled in the art that various changes, omissions, additions and substitutions may be made therein without departing from the scope of my invention, as set forth in the appended claims.

I claim as my invention:

1. A lifting and traversing device for a vehicle having means for retaining it in retracted position on the frame, said device being movable relative to the vehicle frame in the vehicle raised position and including vehicle wheel lifting devices mounted on said device and means for lowering the said device for raising the vehicle partly through the vehicle spring.

2. A lifting and traversing device for a vehicle supportable on the vehicle frame when in retracted position and operable to lift the vehicle substantially by the vehicle supporting springs, in such a manner that the vehicle axle and said device are movable together relative to the vehicle frame.

3. A lifting and traversing device for a vehicle having a frame, hooks pivoted on said device for engagement with portions of the vehicle below the vehicle frame, said hooks and said device being movable relative to the vehicle frame.

4. A lifting and traversing mechanism, for a vehicle including rolling means insertable into engagement with the ground, a device for controlling the actuation of the rolling means to extended and retracted position, means for driving said rolling means, means for engaging said driving means, and means for rendering said driving means effective when said device is actuated through the automatic shifting of the engaging means lengthwise of its supporting axis.

5. A lifting and traversing device for a vehicle including an auxiliary wheel insertable into engagement with the ground, a reciprocable rod for controlling the actuation of said wheel to extended and retracted positions, and means for driving said rolling means longitudinally actuatable into operative position by the initial movement of said rod.

6. A device for raising and lowering a vehicle including, in combination, a fluid actuated mechanism for operating said device, a pump for supplying fluid to the mechanism, an electric generator on said vehicle, and a clutch for connecting and disconnecting the pump to said generator.

7. A device for raising a vehicle including, in combination, a mechanism for actuating said device, and electromagnetic means for effecting the connection of the mechanism to the power device of said vehicle.

8. A raising device for a vehicle having speed sensitive means associated therewith for preventing its operation when the driving means of the vehicle is actuated above a predetermined speed.

9. A device for raising and lowering a vehicle including, in combination, a fluid operated mechanism for actuating said device, a pump for supplying fluid to the mechanism, a clutch for connecting and disconnecting the pump to a driven member of the vehicle, a valve associated with said pump for regulating the flow of fluid to the mechanism and means for preventing the shifting of the valve except when the clutch is disengaged.

10. A raising and lowering device for a vehicle actuatable by a mechanism operable in either one of two directions, means for connecting said mechanism to a driven member of a vehicle and means for preventing the reversal of operation of said mechanism except when the mechanism has been disconnected from the driven member.

11. A raising and lowering device for a vehicle supported through a toggle mechanism to the vehicle, an arm of shorter length than the length of the arm of the toggle mechanism, and a mechanism for actuating said device through said arm.

12. A raising and lowering device for a vehicle supported thereon through a toggle mechanism, and an arm rigidly attached to an arm of said mechanism and angularly disposed relative thereto.

13. A raising and lowering device for a vehicle having a mechanism for effecting the operation of raising the vehicle, biasing means attached to said mechanism and so positioned thereon as to present a greater effective lifting arm when in retracted position than when in vehicle raised position.

14. A raising and lowering device for a vehicle having biasing means continuously acting thereon and exerting a lifting force through a greater arm on said device when in inoperative position than when said device is supporting the vehicle.

15. A raising and lowering device for a vehicle including a wheel supported for rotational movement about an axis, a toggle mechanism for adjusting the position of said wheel, the axis of said wheel being fixed relative to one leg of said toggle.

16. A raising and lowering device for a vehicle including an axle supported against rotational movement, a wheel revolvable thereon, and a toggle for controlling the position of said wheel including an arm in fixed angular relation to said axle.

17. A lifting and traversing device for a vehicle said vehicle having shock absorbers linked to the axle thereof, said device including means for engaging the shock absorber links for limiting the extension of the axle spring during the lifting operation.

18. A lifting and traversing device for a vehicle said vehicle having shock absorbers linked to the axle thereof, said device including means for rigidly securing the axle for limiting the extension of the vehicle springs relative to the frame thereof through the engagement of the shock absorber links when the lifting device is actuated.

19. A lifting and traversing device for a vehicle associated with the frame thereof, biasing means forming a connection therebetween, said biasing means exerting a greater effort when said device is in the inoperative position than when in the vehicle raised position.

BROOKS WALKER.

Patent No. 1,884,932                             Granted October 25, 1932

BROOKS WALKER

The above entitled patent was extended July 24, 1951, under the provisions of the act of June 30, 1950, for 6 years and 214 days from the expiration of the original term thereof.

*Commissioner of Patents.*